United States Patent Office 3,012,078
Patented Dec. 5, 1961

3,012,078
DUSTLESS PENTAERYTHRITOL AND PROCESS OF PREPARATION
Homer E. Peterson and Madison D. Everett, Agnew, Calif., assignors to Commercial Solvents Corporation, New York, N.Y., a corporation of Maryland
No Drawing. Filed Sept. 15, 1958, Ser. No. 760,848
3 Claims. (Cl. 260—632.5)

Our invention relates to dustless pentaerythritol and to a process of producing same.

As ordinarily produced pentaerythritol consists of a high proportion of fine crystals. A large portion of the pentaerythritol is used in the production of synthetic resins in the production of which it is necessary to transport and manipulate pentaerythritol in bulk in substantial quantities. The fineness of the particle size of the pentaerythritol during such handling gives rise to substantial dusting of the pentaerythritol with resultant losses as well as discomfort to those required to handle the material. The dustiness of the material also increases the difficulty of mixing the pentaerythritol with other ingredients with which it is reacted.

We have now discovered that the dustiness of pentaerythritol can be substantially completely eliminated by a relatively inexpensive modification of the customary method of producing pentaerythritol. By using relatively small quantities of glycerol in the water used in the final washing of pentaerythritol crystals the latter after drying are coated with sufficient glycerine to eliminate substantially the dusting ordinarily present in untreated pentaerythritol crystals. Ordinarily, the presence of from 0.5 to 1.0% of glycerine on the dried pentaerythritol crystals is adequate to eliminate dusting of the dried crystals. While a minimum of 0.5% glycerine, on the basis of the dried crystals, serves as a satisfactory means for reducing dusting it is ordinarily desirable to use quantities as high as 1% or higher. It is possible to use substantially higher quanties than 1% so long as the quantity of glycerine used is not sufficient to cause liquid separation by drainage from the dried pentaerythritol. The quantity of glycerine which can be used on the pentaerythritol to render the latter dustless depends to a considerable extent upon the use or uses to which the pentaerythritol is to be applied. One of the principal advantages in the use of glycerine as an anti-dust agent for pentaerythritol is the fact that its presence in the required amounts does not lead to any undesired properties or effects when the treated pentaerythritol is used in the production of synthetic resins.

The pentaerythritol crystals can be treated with the required amount of glycerine in any desired manner. For example, the finished dried pentaerythritol crystals can be passed through a fine mist of glycerine or a thin agitated layer of the crystals can be sprayed with glycerine. Still another method consists of wetting the final dried pentaerythritol crystals with an inert solvent solution of glycerine and then removing the glycerine solvent by evaporation. While the glycerine solvent can be water it is desirable to use a solvent which does not dissolve the pentaerythritol so as to avoid the necessity for the added drying necessary to remove the water.

We have found that a preferred method of treating the pentaerythritol crystals with the required amount of glycerine is to add the glycerine to the wash water used in the final stage of purification of the pentaerythritol. By adding the dust proofing agent at this stage of the production of the pentaerythritol effective coating of the crystals is obtained and at the same time no added drying step is required for the pentaerythritol. The following specific example illustrates our preferred process but it is specifically understood that we are not limited to this particular procedure, our invention consisting broadly of the application of the required amount of glycerine by any suitable process to the pentaerythritol produced in any desired manner. For example, the pentaerythritol can be prepared using either caustic or lime or mixtures of caustic and lime. Likewise, any suitable method of recovering the pentaerythritol can be employed.

*Example*

One mole of acetaldehyde was reacted with four moles of formaldehyde and one mole of sodium hydroxide in dilute aqueous solution containing excess formaldehyde and sodium hydroxide. After the reaction was complete the excess caustic was neutralized and the excess formaldehyde then removed by distillation in the first stage of a two stage evaporator. The resulting crude pentaerythritol was then concentrated in the second stage of the evaporator to the density required for crystallization and cooled in a crystallizer to precipitate crystalline pentaerythritol. The crystals thus produced were recovered, re-dissolved in hot water, treated with activated carbon and then re-crystallized. The crude crystals thus obtained were then transferred to a centrifuge where they were washed with fresh water to remove impurities present in the mother liquor from which the pentaerythritol was crystallized. The crystals were then finally washed in the centrifuge with fresh water containing approximately 10% glycerine, this being an amount sufficient to leave in the final dried crystals from 0.5 to 1.0% of glycerine. After thorough mixing of the crystals in the centrifuge with the aqueous glycerine solution centrifuging was continued until no more liquid was readily removable in this manner. The resulting crystals still containing approximately 10% water were then transferred to a dryer where the remaining water was removed. The resulting dried crystals were a free-flowing powder containing 0.5–1.0% glycerine and were substantially dust-free when subjected to ordinary bulk handling. The product was then packaged for shipment and was found to remain substantially dust free over extended periods of time.

Similar results are obtained by washing the crude pentaerythritol crystals on a filter, followed by a final washing with water containing approximately 10% glycerine, and finally drying the thus washed pentaerythritol to give a substantially dustless dry product containing 0.5–1.0% glycerine.

Now having described our invention what we claim is:

1. A dustless composition in the form of a free-flowing powder comprising a solid normally dusty powdered pentaerythritol admixed with from approximately 0.5% to approximately 1.0% by weight of glycerine, based on the weight of the said pentaerythritol.

2. A process for the production of dustless, free-flowing powdered pentaerythritol which comprises admixing a solid normally dusty powdered pentaerythritol with at least 0.5% by weight of glycerine, based on said pentaerythritol, and not above the quantity which would result in separation of liquid glycerine from said powdered pentaerythritol upon standing.

3. A process for the production of dustless, free-flowing powdered pentaerythritol which comprises washing crystalline pentaerythritol with 10% aqueous glycerine and drying the washed pentaerythritol to give a substantially dustless, dry product containing 0.5–1.0% glycerine.

References Cited in the file of this patent

UNITED STATES PATENTS

| | | |
|---|---|---|
| 2,270,839 | Wyler | Jan. 20, 1942 |
| 2,464,167 | Wyler | Mar. 8, 1949 |
| 2,486,562 | Iamarino | Nov. 1, 1949 |
| 2,604,469 | Herrmann | July 22, 1952 |